(12) United States Patent
Gierlich et al.

(10) Patent No.: US 8,714,912 B2
(45) Date of Patent: May 6, 2014

(54) DETECTION OF DEFORMATION OF A WIND TURBINE BLADE

(75) Inventors: Roland Gierlich, Rheinbach (DE); Jörg Hüttner, München (DE); Andreas Ziroff, Passau (DE)

(73) Assignee: Siemens Aktiengesellschaft, Munich (DE)

( * ) Notice: Subject to any disclaimer, the term of this patent is extended or adjusted under 35 U.S.C. 154(b) by 617 days.

(21) Appl. No.: 12/969,913

(22) Filed: Dec. 16, 2010

(65) Prior Publication Data

US 2011/0150647 A1   Jun. 23, 2011

(30) Foreign Application Priority Data

Dec. 17, 2009   (DE) .......................... 10 2009 058 595

(51) Int. Cl.
*F03D 11/00* (2006.01)
(52) U.S. Cl.
USPC .......................................... 415/118; 416/61
(58) Field of Classification Search
USPC .......................................... 415/118; 416/61
See application file for complete search history.

(56) References Cited

U.S. PATENT DOCUMENTS

| 7,594,797 B2 * | 9/2009 | Wobben .......................... 416/61 |
| 2008/0101930 A1 * | 5/2008 | Bosche .......................... 416/31 |
| 2009/0277266 A1 * | 11/2009 | Wang et al. ................ 73/514.01 |
| 2011/0184665 A1 * | 7/2011 | Olesen ........................... 702/42 |
| 2012/0035865 A1 * | 2/2012 | Fujioka et al. ................. 702/42 |

FOREIGN PATENT DOCUMENTS

| DE | 102 59 680 A1 | 7/2004 |
| DE | 202007001136 U1 | 4/2007 |
| DE | 102006002708 A1 | 7/2007 |
| EP | 0 524 771 A2 | 1/1993 |
| JP | 2008303882 A | 12/2008 |
| WO | 2008119354 A2 | 10/2008 |

* cited by examiner

*Primary Examiner* — Edward Look
*Assistant Examiner* — Liam McDowell

(57) ABSTRACT

An arrangement for detecting bending deflection of a wind turbine blade is provided. The arrangement for the wind turbine includes a radio transmitter and a linear antenna array assigned to the radio transmitter. The radio transmitter is mounted on the blade tip and emits a signal. The antenna array is mounted on the rotor of the wind turbine in a co-rotating manner and receives the signal. On the basis of the transit times of the signal from the rotor to the individual antennas of the array, the position of the radio transmitter relative to the array is determined. In the event of blade deflection, for example when a high wind load is present, the relative position changes which is detected by the arrangement.

11 Claims, 3 Drawing Sheets

DETECTION OF DEFORMATION OF A WIND TURBINE BLADE

CROSS REFERENCE TO RELATED APPLICATIONS

This application claims priority of German Patent Application No. 10 2009 058 595.8 DE filed Dec. 17, 2009, which is incorporated by reference herein in its entirety.

FIELD OF INVENTION

The invention relates to the detection of deformation, in particular bending deflection, of a wind turbine blade.

BACKGROUND OF INVENTION

A typical wind turbine essentially comprises a tower and a rotor having a plurality of blades, e.g. two or three. During operation of the wind turbine, the rotor and its associated blades rotate e.g. as a function of the instantaneous wind strength. Mounted on the tower is a nacelle containing, among other things, a bearing for supporting the rotor and a generator for converting the corresponding rotational energy into electric power. Systems of this kind are well-known.

The sizes of such systems are continually increasing. For example, blades with a length in the order of 50 m or more are used for modern offshore wind turbines delivering nominal outputs in the single-digit megawatt range. The larger the structural dimensions, the greater the mechanical loads on blade, rotor, bearing, tower, and ultimately also on the foundations in which the tower is embedded.

For dimensioning the blades and for adjusting and controlling the wind turbine during operation, precise information is required concerning the dynamic states in particular of the blades. For example, blade deflection must be monitored in order to rule out the possibility of the blades striking the tower of the wind turbine as they rotate. The probability of a blade being bent to the extent that such a strike can occur naturally increases with blade length and with the wind force instantaneously acting on the blade.

The wind turbines are generally oriented such that the wind direction parallels as far as possible the axis of rotation. The blades are consequently subjected to a force which pushes the rotating blades in the direction of the tower, the blade tip being deflected the farthest from a normal position in which the blade is not deformed, i.e. bent, that is to say in particular in situations in which there is no wind load on the blade.

For example, a control wire method can be used to detect any deflection of the blade by monitoring the length of a control cable stretched between the blade tip and another point which is ideally close to the axis of rotation. The problem with this method, in the specific case of the wind turbine, is the mounting of the control cable because of the rotating parts.

Strain gages can also be used which must be fixed to the surface of the blade and which are deformed correspondingly to the deflection of the blade. The output signal of the strain gages is then indicative of the deflection. The problem here is the high installation overhead and the susceptibility to lightning strikes, for example.

Another alternative are optical methods, such as laser distance measurement or analysis of camera images. Laser distance measurement is problematic in that mounting for an optimum measuring position is very complex: If a measuring position on the static part of the system is required, 360° monitoring of blade deflection, i.e. monitoring over the entire circumference swept by the blade tip, can only be implemented at high cost and with great complexity. Although camera optical systems mounted close to the rotor hub provide very accurate information about the dynamic behavior of the blade, a high level of overhead is required for the signal or, as the case may be, image processing. Moreover, the camera optical systems in particular cannot operate in all weather conditions.

A device for monitoring a wind power installation for possible blade-tower strikes is described in DE 20 2007 001 136 U1, for example. There, a distance sensor for contactless measurement of the distance of the blade from a predefined point on the wind power unit is installed thereon. If a critical clearance is not achieved, a strike warning is output. A radio-based monitoring system is described in JP 2008303882 AA.

SUMMARY OF INVENTION

An object of the invention is to disclose an alternative means of detecting wind turbine blade deformation.

This object is achieved by the inventions disclosed in the independent claims. Advantageous embodiments will emerge from the dependent claims.

The inventive solution makes use of the fact that the essential information that can be used to avoid blade-tower strikes is in the position or rather displacement of, in particular, the tip of the blade in the direction of the axis of rotation. Basically it is of course also conceivable not to monitor specifically the position of the tip of the blade, but another point on the blade which is closer to the axis of rotation of the rotor than the blade tip, viewed in the direction of the longitudinal axis of the blade. Similarly, a plurality of points viewed in the direction of the blade's longitudinal axis can be monitored so that ultimately not only the deflection or rather displacement of the blade at a point can be determined, but, depending on the number of points monitored, the actual deformation of the blade, i.e. the behavior of the entire blade at a particular wind load.

The deflection of the blade tip is inventively measured using an active radio direction finding method.

The inventive arrangement for detecting deformation, in particular bending deflection, of a blade of a wind turbine, includes
  a tower,
  a nacelle disposed on the tower and containing a bearing,
  a rotor which is mounted in the bearing so as to be rotatable about an axis of rotation R and to which the blade is fixed such that the blade can be caused to rotate together with the rotor about an axis of rotation R, in particular under wind load. The arrangement incorporates a radio transmitter and an antenna device assigned to the radio transmitter, said antenna device being embodied to receive a signal S which can be emitted by the radio transmitter. In this arrangement
  either the radio transmitter or the antenna device is mounted on the blade and
  the signal receivable by the antenna device can be used to detect the position of the radio transmitter in the direction of the axis of rotation R relative to the antenna device.

The antenna device is advantageously an antenna array having a plurality of individual antennas. In this arrangement said array is in particular a linear antenna array whose individual antennas viewed in the direction of the axis of rotation R are disposed essentially in series.

An evaluation device is provided to which the signals that can be received by means of the individual antennas can be fed, said evaluation device being embodied to detect an offset of the radio transmitter compared to a normal position on the basis of the signals fed thereto.

In one embodiment variant, the radio transmitter is mounted on the blade, in particular on an outer tip of the blade, and the antenna device

- is mounted, at least viewed in the direction of the axis of rotation, essentially at a fixed location on the wind turbine,
- is mounted on the rotor, on or in the nacelle or on the tower and/or
- is disposed such that it co-rotates with the rotation of the rotor and blade.

A plurality of radio transmitters disposed in a distributed manner along the blade's longitudinal axis can also be mounted on the blade.

In another embodiment variant, the antenna device is mounted on the blade, in particular on an outer tip of the blade, and the radio transmitter

- is mounted, at least viewed in the direction of the axis of rotation, essentially at a fixed location on the wind turbine,
- is mounted on the rotor, on or in the nacelle or on the tower and/or
- is disposed such that it co-rotates with the rotation of the rotor and blade.

The wind turbine can have a plurality of blades connected to the rotor, a radio transmitter and an antenna device assigned to the radio transmitter being provided for each blade.

In an inventive method for detecting deformation of a blade of a wind turbine it is assumed as a prerequisite that the wind turbine includes

- a tower,
- a nacelle disposed on the tower and containing a bearing,
- a rotor which is mounted in the bearing so as to be rotatable about an axis of rotation R and to which the blade is fixed such that the blade can be caused to co-rotate with the rotor about an axis of rotation R, in particular under wind load.

According to the invention,

- a radio transmitter mounted on the blade emits a signal S which is received by an antenna device mounted on the wind turbine, or
- an antenna device mounted on the blade receives a signal S emitted by a radio transmitter which is mounted on the wind turbine.

On the basis of said signal S, the position of the radio transmitter relative to the antenna device in the direction of the axis of rotation R is detected and the blade deformation is inferred from the position of the radio transmitter relative to the wind turbine.

In order to enable interventions in the control electronics for the wind turbine, continuous 360° monitoring is implemented in the ideal case, i.e. the position of the blade tip is monitored at all times and over the entire circumference swept by the blade tip.

In short, the invention therefore relates to detection of wind turbine blade deflection with the aim of providing early detection of the risk of the blade striking in particular the tower of the wind turbine. For this purpose an arrangement for the wind turbine is proposed, comprising a radio transmitter and a linear antenna array assigned to said radio transmitter. In an exemplary embodiment, the radio transmitter can be mounted on the blade tip and e.g. continuously emit a signal S. The antenna array is mounted in a co-rotating manner on the wind turbine rotor and receives the signal S. The position of the radio transmitter relative to the array can be determined on the basis of the transit times of the signal from the rotor to the individual antennas of the array. In the event of blade deflection, i.e. if a high wind load is present, the relative position changes, which can be detected using the arrangement according to the invention. If the relative position is found to change in excess of a certain maximum, i.e. there is a risk of a tower strike, appropriate safety action can be taken.

Some advantages of the invention may be summarized as follows:

- The continuous 360° recording of the position of the blade tip, from which the bending deflection of the blade can also ultimately be inferred, furnishes information about the dynamic behavior of the wind turbine, thereby providing a design aid for blade development work. Optimized designs e.g. based on an achievable lower stiffness promise significant potential savings in the total costs of the wind power installation.
- The inventive determination of the out-of-plane angle, i.e. the offset of the blade tip from the normal position, by means of a radio direction finding system is advantageously unaffected by weather conditions.
- In addition, the out-of-plane angle can be measured with a high degree of accuracy and at a high measuring rate—in contrast to a camera-based system, for example.
- The system according to the invention can also be retrofitted in existing installations without major overhead.

BRIEF DESCRIPTION OF THE DRAWINGS

Further advantages, features and details of the invention will emerge from the exemplary embodiment described below and with reference to the accompanying drawings, in which.

In the figures, identical or mutually corresponding areas, components, component groups or method steps are identified by the same reference signs.

DETAILED DESCRIPTION OF INVENTION

Figure 1:
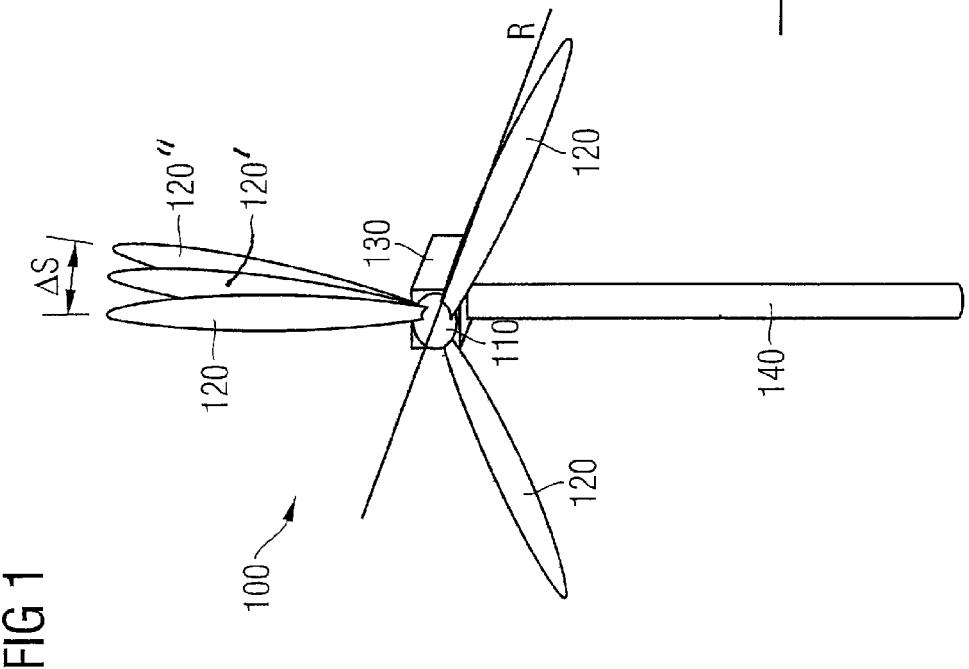
FIG. 1 shows a wind turbine in a perspective view.

FIG. 1 shows a wind turbine 100 of the type well-known from the prior art. The wind turbine 100 has a rotor 110 on which three blades 120 are mounted in the example shown. When wind load is present, the blades 120 are driven in a known manner such that the rotor 110 is caused to rotate about an axis of rotation R. The wind turbine 100 also comprises a nacelle 130 in which the rotor 110 is bearing-mounted (not shown) and a generator is provided with which the rotational energy of the rotor 110 is converted into electric power when wind load is present (other well-known components of such a wind turbine, e.g. catwalk gratings mounted on the outside of the nacelle, etc. are not enumerated individually, but are inclusively assigned to the nacelle 130). This is also sufficiently well-known. The nacelle 130 is mounted on a tower 140 of the wind turbine. In this arrangement said nacelle 130 is generally disposed on the tower 140 in a rotatable manner about the longitudinal axis of the tower 140 in order to enable the rotor 110 with the blades 120 to be optimally aligned to the wind direction W.

FIG. 1 shows, with the aid of the continuous lines, the situation without wind load, i.e. a normal position of the wind turbine. In the normal position, the blades 120 are not deflected or deformed and are in the y-z plane of a Cartesian coordinate system K which is likewise shown in FIG. 1. The axis of rotation R is aligned in the direction of the x-axis of the coordinate system K. Viewed in the x-direction, the origin of the coordinate system K shall be at the position where the blades 120 are connected to the rotor 110. In the y- and z-direction, the origin shall lie on the axis of rotation R (this is shown differently in FIG. 1 for the sake of clarity).

In FIG. 1, 120' indicates the situation with wind load present for one of the blades 120.

The nacelle 130 is in this case oriented such that the axis of rotation R parallels the wind direction W. Blade 120" is deflected due to wind load is bent to a greater or lesser extent in the direction of the x-axis, i.e. the axis of rotation R, depending on the stiffness of the blade, the offset of the blade tip 121 from the normal position being designated by $\Delta s$.

Figure 2:
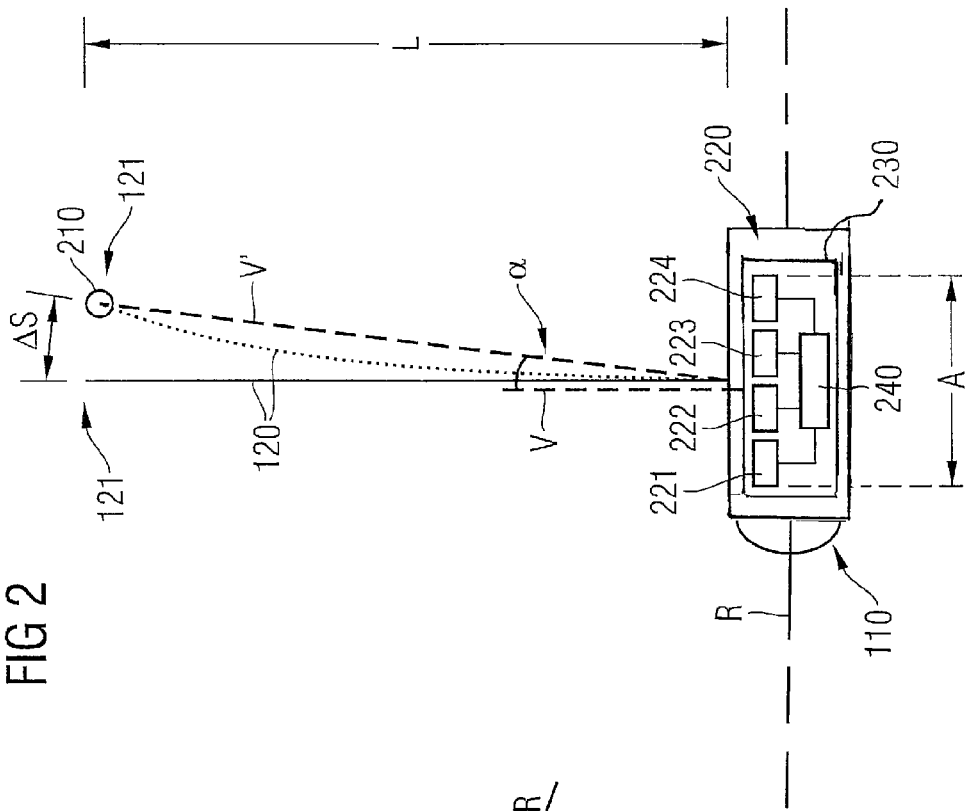
FIG. 2 shows a cross-section through a wind turbine having a radio transmitter on the blade tip.

The same situation is illustrated in FIG. 2, which shows a simplified side view of the rotor 110 with a blade 120. As in FIG. 1, a continuous line is used to denote the blade 120 in the normal position, while the dotted line indicates the blade 120 when wind load is present. It can be clearly seen that the blade 120 under wind load is comparatively heavily deflected. Likewise shown in FIG. 2 are two dashed reference lines V, V' between the rotor and the tip 121 of the blade 120 in the normal state and between the rotor 110 and the tip 121 of the blade 120 under wind load. As may be easily seen, there is formed between the connecting lines V, V' an out-of-plane angle $\alpha$ which is a function of the offset $\Delta s$ of the blade tip from the normal position and therefore of the blade deflection. Accordingly, in the normal position $\alpha=0°$.

According to the invention, an active radio transmitter 210 is provided at least on the tip 121 of the blade, while a co-rotating antenna device 220 is mounted on the rotor 110. The antenna device 220 is part of a receiving device 230 which, in addition to the antenna device 220, also has an electronic evaluation device 240. The evaluation device 240 can be accommodated in the nacelle 130 as shown in FIG. 2. Alternatively, it is of course possible to position the evaluation device 240 e.g. in the tower 140 or elsewhere. The receiving device 230 forms together with the radio transmitter 210 a radio direction finding system 200 which allows the out-of-plane angle $\alpha$ and therefore the offset $\Delta s$ of the blade tip 121 to be determined or monitored.

The antenna device 220 is implemented as a linear antenna array 220 which, in the example shown, has four individual antennas 221-224 disposed in series, viewed in the direction of the axis of rotation R, thereby enabling the out-of-plane angle $\alpha$ to be accurately determined. The greater the number of individual antennas, the higher the accuracy in determining the out-of-plane angle $\alpha$. In the example shown here, the antenna array 220 is mounted in a co-rotating manner on the rotor 110 (only shown schematically) so that it is ensured that a continuous radio link between radio transmitter 210 and antenna array 220 can be maintained. This means that 360° monitoring of blade deflection is possible, i.e. the entire circumference swept by the blade tip can be monitored. Specifically, the antenna array 220 could be mounted e.g. on the hub of the rotor 110.

The underlying measuring principle consists in that the active radio transmitter 210 emits a signal S which is received by the individual antennas 221-224. In the normal position in which the blade 120 is not deformed, the signal S requires transit times $t1_0$ to $t4_0$ to the different antennas 221-224, i.e. to the antenna 221, for example, a transit time $t1_0$, to the antenna 222 a transit time $t2_0$, etc.

To a first approximation it can be assumed that the transit times $t1_0$ to $t4_0$ are approximately the same, i.e. also that the imaginary connecting lines between the individual antennas 221-224 and the radio transmitter 210 are approximately parallel to one another. However, this of course depends, on the one hand, on the position of the antenna array 220 in the direction of the axis of rotation R and, on the other, on the proportions of the wind turbine and the antenna array, i.e. on the length L of the blades 120 and the extent A of the antenna array 220 in the direction of the axis of rotation R. For the case that the extent A is not negligible compared to the length L, it would be advisable first to perform calibration of the radio direction finding system in the normal position by e.g. measuring and storing the transit times $t1_0$ to $t4_0$ in the normal position.

Figure 3:
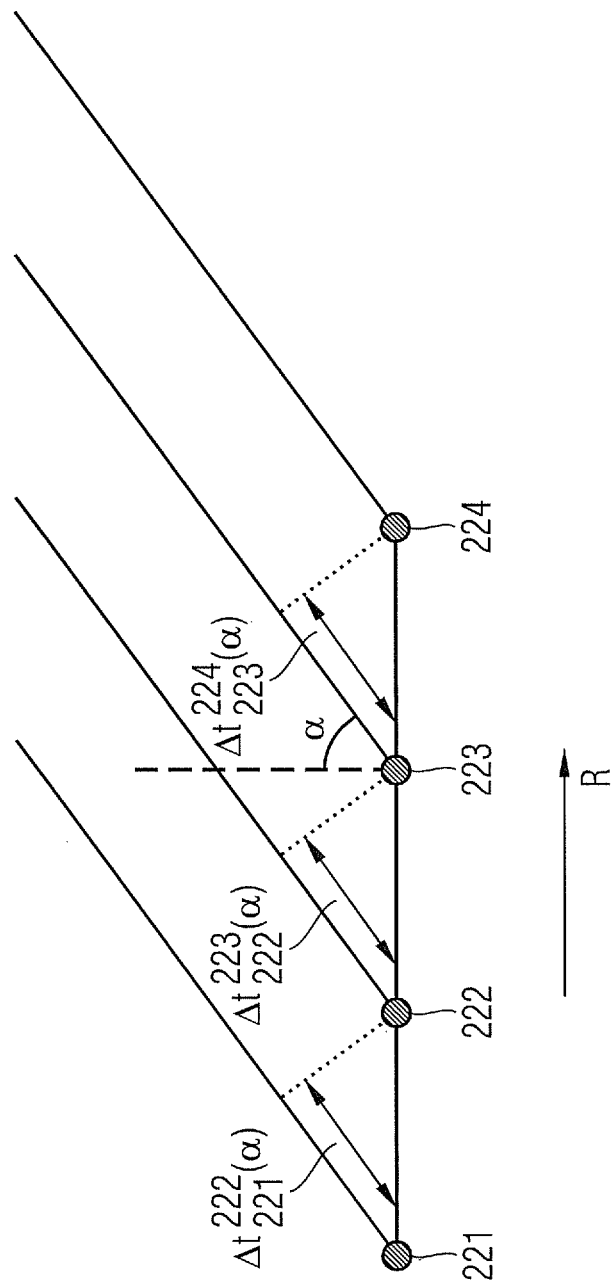
FIG. 3 shows an antenna array with a signal incident at an out-of-plane angle α.

When wind load is present, the blade 120 is deflected, as shown in FIGS. 1 and 2, so that the out-of-plane angle $\alpha$ arises concomitantly with the offset $\Delta s$ of the blade tip 121 in the direction of the axis of rotation R. Different transit times $t1_\alpha$ to $t4_\alpha$ of the signal S from the radio transmitter 210 to the individual antennas 221-224 of the antenna array 220 result depending on the out-of-plane angle $\alpha$ or the offset $\Delta s$. This is shown schematically in FIG. 3. Between the transit times of two adjacent antennas of the antenna array 220 there arises a difference $\Delta t_j^i(\alpha) = ti_\alpha - tj_\alpha$ (where i=221, 222, 223 and j=222, 223, 224 and i≠j), $ti_\alpha$ denoting the transit time of the signal S from the radio transmitter 210 to the antenna i. Assuming the above-mentioned approximation, this means that the imaginary connecting lines between the individual antennas and the radio transmitter are parallel to one another, and that all the differences $\Delta t_j^i(\alpha)$ are the same (for all i, j). Accordingly, this is also the case with the phases $\phi 221_\alpha$ to $\phi 224_\alpha$ of the signals received at the individual antennas 221-224. The out-of-plane angle $\alpha$ and therefore the offset $\Delta s$ can finally be determined from the difference $\Delta t_j^i(\alpha)$ or rather analogously thereto from the phase differences $\Delta \phi_j^i(\alpha)$.

The signal processing for determining the out-of-plane angle $\alpha$ or offset $\Delta s$ from the transit times or phases takes place in the evaluation device 240 of the receiving device 230. To determine the out-of-plane angle $\alpha$, various per se known methods can be used. For example, the already well-known FFT ("Fast Fourier Transformation"), MUSIC ("Multiple Signal Classification") or ESPRIT ("Estimation of Signal Parameters via Rotational Invariance Techniques") algorithms are suitable for this purpose.

The characteristic and geometry of the antenna array 220 are critical for problem-free operation of the radio direction finding system 200. With increasing distance d of the individual antennas 221-224 from one another (cf. FIG. 3), there is a concomitant increase in the angular resolution, i.e. the accuracy of determination of the out-of-plane angle $\alpha$. At the same time, however, the unambiguity range deteriorates. However, the latter can be compensated by using directional antennas whose main lobe width corresponds to the unambiguity range.

Suitable radio transmitters 210 include various transmitter types, the receiver architecture naturally having to be matched to the type of transmitter selected. A radio transmitter which makes the greatest possible use of the available bandwidth in order to increase the accuracy of the angular measurement is advantageous. For example, so-called CW ("Continuous Wave"), FMCW ("Frequency Modulated Continuous Wave") or UWB (Ultra Wide Band) transmitters would lend themselves as suitable methods:

A CW transmitter produces an unmodulated carrier signal, i.e. only a single frequency line. This allows a very simple transmitter and receiver architecture. The offset Δs or out-of-plane angle α is determined as described above in the evaluation device 240 of the receiving device 230.

An FMCW transmitter differs from the CW transmitter in that it does not transmit a single, constant frequency line. The frequency of a signal produced by a FMCW transmitter is varied over time. In particular, but not necessarily, a linear relationship exists between the time and frequency of the signal. FMCW signals provide a high degree of measuring accuracy and reliability, since they use a higher bandwidth than CW signals and the channel used in each case is also time-resolvable.

A UWB transmitter produces signals with a very large bandwidth. In UWB system applications, a distinction is drawn between multiband OFDM ("Orthogonal Frequency Division Multiplex") systems and pulse transmission methods. The pulse transmission methods in particular are especially promising for the present application, since they incorporate energy-saving concepts for the radio transmitter on the blade tip because of the use of short pulses, e.g. with pulse durations<2 ns. Various receiver concepts are available for receiving and analyzing such signals. A suitable option is, for example, reception based on frequency range analysis wherein the entire UWB band is analyzed step by step. This method effectively constitutes a combination from the two above-mentioned methods (CW, FMCW), since a pulsed signal is made up of a plurality of individual carriers separated by the pulse repetition rate. Basically all coherent receiver architectures can be used.

Ideally, of course, not just one blade of a wind turbine is equipped with a radio transmitter, but all the blades. Accordingly, a plurality of antenna arrays would be mounted on the rotor.

Depending on the blade length and range of the radio transmitter, it may be advisable to mount the radio transmitter not on the outer tip of the blade, but in an area further inward, viewed radially.

In the above-described system, the antenna array is disposed in a co-rotating manner on the rotor of the wind turbine. This allows uninterrupted monitoring of the position of the blade tip during the entire revolution. However, it is also basically possible, of course, to dispose the antenna array in a fixed or non-co-rotating manner, e.g. on the nacelle. In this case, if a radio transmitter is disposed on each blade, it would then not be absolutely necessary to provide a separate antenna array for each radio transmitter. A single common antenna array could be used. The signals emitted by the individual radio transmitters would then advantageously be coded such that the signals are to be unambiguously assigned to the radio transmitters and therefore to the blades.

Since the blades of a wind turbine are not generally of solid design, it is basically conceivable to dispose the radio transmitter inside the blade.

It would likewise be basically conceivable to dispose the antenna array on the blade, with the radio transmitter being mounted in a co-rotating manner on the rotor or in a fixed manner on the nacelle. Irrespective of which of the two components—radio transmitter or antenna device—is mounted on the blade, there are a variety of conceivable positioning options for the "other" component. Only the possible requirement that 360° monitoring shall be possible dictates that the other component must be mounted on the rotor or on another co-rotating part. For example, in this case it is also conceivable to mount one component on the blade tip, i.e. on the distal end of the blade viewed from the axis of rotation, and to mount the other component not on the rotor but on the proximal end of the blade, i.e. in the immediate vicinity of the mounting point of the blade to the rotor, for example. If 360° monitoring is not required, the other component can be mounted at a position on the wind turbine where it is ensured that a direct radio link between radio transmitter and antenna device is at least intermittently possible. One requirement for the positioning of the other component is to ensure that, even when wind load is present, its position remains fixed at least viewed in the direction of the axis of rotation R, in particular relative to the tower. This requirement is met if the other component is mounted e.g. on the rotor, on the nacelle, on the tower or even on the foundation of the wind turbine, with vibration of the wind turbine itself possibly causing interference in the last embodiment.

Figure 4:
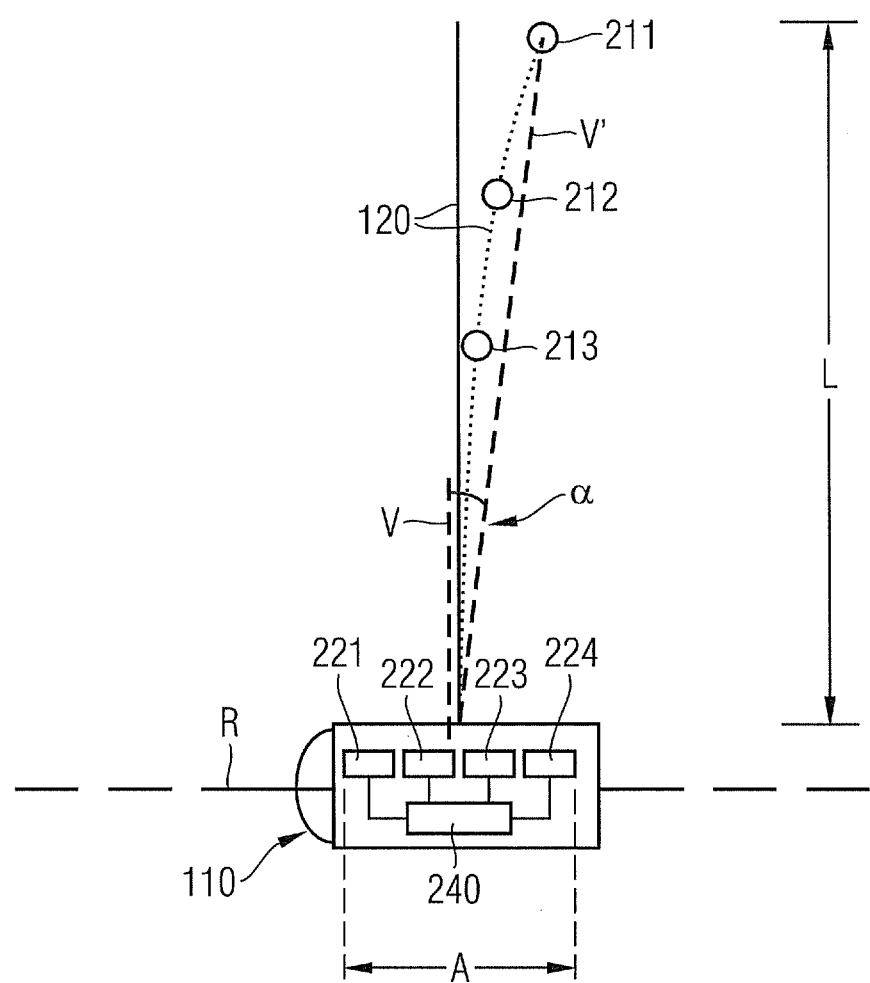
FIG. 4 shows a cross-section through a wind turbine having a plurality of radio transmitters distributed over the length of the blade.

Lastly, FIG. 4 shows an arrangement according to FIG. 2 wherein not just one radio transmitter is mounted on the tip of the blade 120 but a plurality of essentially similar radio transmitters 211, 212, 213 which are disposed in a distributed manner over the blade's longitudinal axis. With this arrangement it is possible to monitor not only the position of the tip, but also the deformation of the blade over its entire length. This can provide indications of the dynamics, the vibration behavior, the stability/stiffness, and possibly other blade parameters. By increasing the number of radio transmitters distributed over the length of the blade, more accurate monitoring is naturally possible. The different radio transmitters can e.g. encode the respectively transmitted signal differently so that, in the subsequent analysis of the signals received by the antenna array 220 in the evaluation device 240, it is possible to discriminate between the different signals of the individual radio transmitters.

Depending on requirements, a combination of the above-described possibilities is of course an available option.

The invention claimed is:

1. An arrangement for detecting a deformation of a blade of a wind turbine, the wind turbine comprising:
   a tower,
   a nacelle disposed on the tower and containing a bearing,
   a rotor which is mounted in the bearing such that the rotor rotates about an axis of rotation, and the blade being fixed to the rotor such that the blade co-rotates with the rotor about the axis of rotation,
   wherein the arrangement comprises:
   a radio transmitter mounted on a first component of the wind turbine, and
   an antenna device mounted on a second component of the wind turbine such that the antenna device co-rotates with the radio transmitter, the antenna device includes a plurality of individual antennas assigned to the radio transmitter, each of the individual antennas being embodied to receive a signal emitted by the radio transmitter, the antenna device mounted such that the signal emitted by the radio transmitter is received continuously over a 360 degree rotation of the rotor,
   wherein the signal continuously received by the antenna device is used to detect a position of the radio transmitter relative to the antenna device in the direction of the axis of rotation,
   wherein the first component is the blade and the second component is the rotor or
   wherein the first component is the rotor and the second component is the blade.

2. The arrangement as claimed in claim 1, wherein the antenna device is an antenna array which includes the plurality of individual antennas.

3. The arrangement as claimed in claim 2, wherein the antenna array comprises a linear antenna array whose individual antennas are disposed essentially serially viewed in a direction of the axis of rotation.

4. The arrangement as claimed in claim 1, further comprising:
- an evaluation device,
- wherein signals received by the individual antennas are submitted to the evaluation device, and
- wherein the evaluation device determines, based upon the submitted signals, an offset of the radio transmitter compared to a normal position.

5. The arrangement as claimed in claim 3, further comprising:
- an evaluation device,
- wherein signals received by the individual antennas are submitted to the evaluation device, and
- wherein the evaluation device determines, based upon the submitted signals, an offset of the radio transmitter compared to a normal position.

6. The arrangement as claimed in claim 1, wherein the radio transmitter or the antenna device is mounted on an outer tip of the blade.

7. The arrangement as claimed in claim 6, wherein a plurality of radio transmitters is mounted on the blade disposed in a distributed manner over a longitudinal axis of the blade.

8. A method for detecting a deformation of a blade of a wind turbine, comprising:
- providing an arrangement as claimed in claim 1;
- continuously emitting a signal by the radio transmitter;
- continuously receiving the signal by the antenna device;
- detecting, based upon the signal, a position of the radio transmitter relative to the antenna device in a direction of the axis of rotation; and
- determining, for the entire 360 degree rotation of the hub, a deformation of the blade based upon the position of the radio transmitter relative to the antenna device.

9. The method as claimed in claim 8, wherein the radio transmitter is mounted on an outer tip of the blade.

10. The method as claimed in claim 8, further comprising:
- providing an evaluation device; and
- submitting the signal received by the antenna device to the evaluation device.

11. The method as claimed in claim 10, further comprising:
- determining, by the evaluation device, based upon the submitted signal, an offset of the radio transmitter compared to a normal position.

\* \* \* \* \*